(12) United States Patent
Sazzad et al.

(10) Patent No.: US 6,529,930 B1
(45) Date of Patent: Mar. 4, 2003

(54) METHODS AND APPARATUS FOR PERFORMING A SIGNED SATURATION OPERATION

(75) Inventors: Sharif Mohammad Sazzad, Monmouth Junction, NJ (US); Michael A. Plotnick, Southampton, PA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/393,591

(22) Filed: Sep. 9, 1999

Related U.S. Application Data

(60) Provisional application No. 60/108,579, filed on Nov. 16, 1998.

(51) Int. Cl.[7] .............................................. G06F 9/302
(52) U.S. Cl. ...................................... 708/552; 708/498
(58) Field of Search .................................. 708/552, 498

(56) References Cited

U.S. PATENT DOCUMENTS

| | | | | |
|---|---|---|---|---|
| 5,448,509 A | | 9/1995 | Lee et al. ..................... | 364/737 |
| 5,508,951 A | * | 4/1996 | Ishikawa ...................... | 708/552 |
| 5,644,519 A | | 7/1997 | Yatim et al. ............. | 364/736.02 |
| 5,847,978 A | * | 12/1998 | Ogura et al. ................. | 708/552 |
| 5,915,109 A | * | 6/1999 | Nakakimura et al. ....... | 708/552 |
| 5,959,874 A | * | 9/1999 | Lin et al. ..................... | 708/700 |
| 5,974,540 A | * | 10/1999 | Morikawa et al. ........... | 708/552 |
| 6,202,077 B1 | * | 3/2001 | Smith ........................... | 708/552 |
| 6,237,084 B1 | * | 5/2001 | Morikawa et al. ........... | 708/552 |

OTHER PUBLICATIONS

International Standards Organization—Moving Picture Experts Group, Recommendation H.222.0, ISO/IEC 13818–1 titled "Information Technology—Generic coding of Moving Pictures and Associated Audio: Systems", Nov. 13, 1994, pp. ii–130.

International Standards Organization—Moving Picture Experts Group, Recommendation ITU–T H.262, ISO/IEC 13818–2 titled "Information Technology—Generic Coding of Moving Pictures and Associated Audio Information: Video", Nov. 9, 1994, pp. i–222.

\* cited by examiner

Primary Examiner—David H. Malzahn
(74) Attorney, Agent, or Firm—Straub & Pokotylo; Michael P. Straub

(57) ABSTRACT

Methods and apparatus for performing signed saturation of binary numbers to arbitrary powers of two are described. Given an n-bit signed binary word, the methods and apparatus of the present invention perform a signed saturation to k-bits where the value of k can vary such that 1<k<n. Through the use of hardware circuits of the present invention the signed saturation operation is implemented in a more efficient manner than software implementations which utilize multiple compare operations. The signed saturation circuits of the present invention can be incorporated into processors, e.g., CPUs, to provide a hardware implementation within a CPU for a signed saturation processor instruction, e.g., either a SISD OR SIMD saturation command or instruction. The signed saturation circuits can accept the data value upon which the operation is to be performed, and, optionally, a value k indicating the number of bits to which individual data value are to be saturated. In MPEG-2 decoding, at the end of the inverse quantization process the quantities being processed undergo signed saturation to 12-bits. In various embodiments, one or more signed saturation circuits of the present invention are incorporated into a fixed function hardware circuit that performs, for example, MPEG-2 video decoding to perform the saturation to 12 bits.

26 Claims, 8 Drawing Sheets

METHODS AND APPARATUS FOR PERFORMING A SIGNED SATURATION OPERATION

RELATED APPLICATIONS

This application claims the benefit U.S. Provisional Application Ser. No. 60/108,579, filed Nov. 16, 1998.

FIELD OF INVENTION

The present invention relates to methods and apparatus for performing saturation operations, e.g., signed saturation operations.

BACKGROUND OF THE INVENTION

Signed saturation operations are used to limit values to a pre-selected range of values, e.g., a range of values extending from and including a positive saturation value (PSV) which serves as an upper bound or threshold, and a negative saturation value (NSV) which serves as an lower bound or threshold. Such operations are used in numerous applications including MPEG-2 video decoding to limit the size and/or range of values which need to be stored and/or processed.

FIG. 1 figuratively illustrates a signed saturation operation in terms of three regions identified using the reference numerals 1, 2, 3. As discussed above, the PSV and NSV serve as threshold values in determining an output value Y based on an input value X. In FIG. 1, region 1 corresponds to values of X which are greater than the PSV. For each value of X falling within region 1, an output value PSV is generated. Thus, values of X exceeding the threshold PSV are limited to the PSV.

Region 2 extends between and includes the PSV and NSV. In this region, an input value X is not outside the bounds determined by the PSV and NSV. Accordingly, in region 2, the output value Y is set equal to X, i.e., each input value is output without being altered. Region 3 corresponds to values less than the NSV. In this region, the output value Y is set equal to the NSV, i.e., for each input value X which falls in this region, an output value Y equal to the NSV is produced.

Most modern digital devices, e.g., computers, digital video decoders, digital communications devices, etc. operate using binary numbers, i.e., numbers represented using 1's and 0's. In such digital systems, 2's compliment representation is frequently used to represent negative numbers. In such a system, the left most bit of a number represents the most negative possible value that can be produced using a fixed number, e.g., k, of bits. Accordingly, a k-bit number expressed using two's compliment representation can take on the values in the range of:

$$-2^{k-1} \text{ to } +2^{k-1}-1.$$

As discussed above, a signed saturation operation is frequently used to limit an input value to a range of values. In particular, it is often desirable to use a signed saturation operation to limit values to a range which may be represented using a fixed number, e.g., a target saturation width, of k bits. In such cases, the PSV will be $+2^{k-1}-1$ while the NSV will be $-2^{k-1}$. For example, input values in a range requiring N bits, e.g., 16 bits, per value, may be processed using a signed saturation operation to generate a set of values which can be represented using k, e.g., 8, bits per value.

Frequently, signed saturation operations are implemented through the use of software which utilizes multiple standard compare operations to perform the saturation operation. Unfortunately, such compare operations can be costly in terms of processing requirements and time consuming to implement. In the case of MPEG-2 video decoding and other applications which require a large number of signed saturation operations to be performed, the time and processing resources required to perform signed saturation operations using software and multiple compare operations can hinder overall performance.

Given that MPEG-2 video decoding applications and other applications which utilize signed saturation operations are becoming ever more common on computer systems, e.g., personal computers, there is a growing need for improved methods of implementing signed saturation operations.

By incorporating multiple saturation circuits into a single processor, support for single instruction multiple data (SIMD) signed saturation operations is achieved. In such an embodiment, multiple signed saturation operations are performed simultaneously on the data associated with a SIMD saturation instruction.

The saturation circuits of the present invention can be incorporated into a wide range of digital devices, in addition to processors, e.g., they can be incorporated into video decoders.

In particular, there is a need for methods and apparatus for implementing signed saturation operations in computers and other digital electronics devices without having to utilize software involving multiple compare operations. In order to support a wide range of applications, it is desirable that at least some new methods and apparatus be capable of supporting a range of output values determined by a variable target width of k binary bits. It is also desirable that at least some methods and apparatus be capable of supporting single instruction multiple data (SIMD) processor operations.

SUMMARY

Methods and apparatus for performing signed saturation of binary numbers to arbitrary powers of two are described. Given an n-bit signed binary word, the methods and apparatus of the present invention perform a signed saturation to k-bits where the value of k is allowed to vary such that 1<k<n. Through the use of hardware circuits of the present invention the signed saturation operation is implemented in a more efficient manner than software implementations which utilize multiple compare operations.

The signed saturation circuits of the present invention can be incorporated into processors, e.g., CPUs, to provide hardware implementation within the CPU that supports a signed saturation processor instruction. The signed saturation instructions can accept the data value or values upon which the operation is to be performed, and, optionally, a value k indicating the number of bits to which the data value is to be saturated. In response to a signed saturation instruction, in accordance with the present invention, one or more saturation circuits are used to implement the instruction and perform a saturation operation on the data value or values which are received with the instruction. In the case of a SIMD instruction, multiple saturation circuits are used in parallel to implement the instruction.

In MPEG-2 decoding, at the end of the inverse quantization process the quantities being processed undergo signed saturation to 12-bits. In various embodiments, one or more signed saturation circuits of the present invention are incorporated into a fixed function hardware circuit that performs, for example, MPEG-2 video decoding.

Additional features and embodiments of the present invention are discussed in the detailed description which follows.

DETAILED DESCRIPTION

Figure 1:
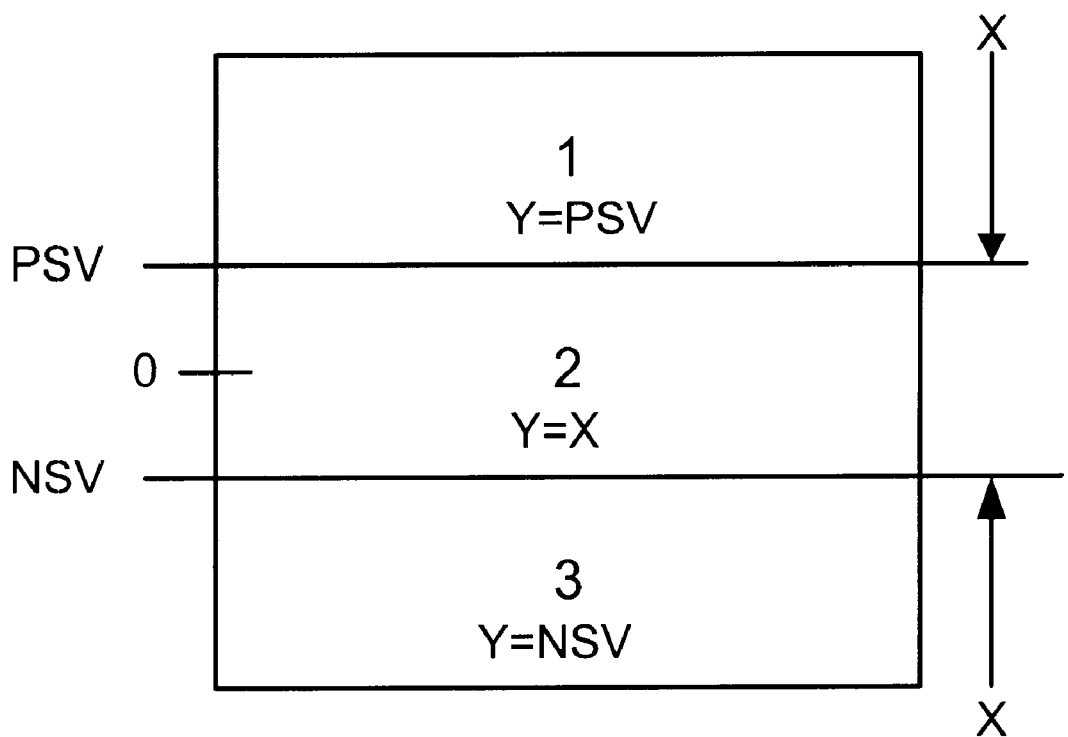
FIG. 1 illustrates a signed saturation operation.

As discussed above, the present invention is directed to methods and apparatus for performing saturation operations and, in particular, signed saturation operations performed on values represented, e.g., using 2's compliment notation.

The function addressed by this invention may be described as follows: given a number, x, that is represented by n bits, how can it be saturated to an arbitrary k-bit representation where: 1<k<n, such that the output value, y, is assigned according to the following equation:

$$y = \begin{cases} 2^{k-1} - 1 & \text{if } x > 2^{k-1} - 1 \\ -2^{k-1} & \text{if } x < -2^{k-1} \\ x & \text{otherwise} \end{cases} \quad (1)$$

A solution to this generalized problem may be understood by considering a simpler, specific case. Consider the case when n=8 and hence 1<k<8. Here the input value x has the following 2's compliment binary representation [$x_7\ x_6\ x_5\ x_4\ x_3\ x_2\ x_1\ x_0$], where the $x_i$'s denote the individual bits that compose x.

First, consider the case when x is positive. In this case, we know that when x is positive the bit $x_7=0$. Now, defining a signal enable_positive_saturation (EPS) as follows:

$$\text{enable\_positive\_saturation} = \begin{cases} \text{TRUE} & \text{if } x > 2^{k-1} - 1 \\ \text{FALSE} & \text{otherwise} \end{cases} \quad (2)$$

This signal may be used to determine when, for some input x and target data width k, the output y is required to saturate to the largest positive value that is allowed by the k bits: $2^{k-1}-1$. For each value of k that is in the range 1<k<n, it is possible to determine a logical expression using the $x_i$'s that defines the behavior of the enable_positive_saturation signal. Table I below shows these logical expressions.

TABLE I

Logic expression for enable_positive_saturation when n = 8.

| K | enable_positive_saturation |
|---|---|
| 7 | $\overline{x_7} \cdot x_6$ |
| 6 | $\overline{x_7} \cdot (x_6 + x_5)$ |
| 5 | $\overline{x_7} \cdot (x_6 + x_5 + x_4)$ |
| 4 | $\overline{x_7} \cdot (x_6 + x_5 + x_4 + x_3)$ |
| 3 | $\overline{x_7} \cdot (x_6 + x_5 + x_4 + x_3 + x_2)$ |
| 2 | $\overline{x_7} \cdot (x_6 + x_5 + x_4 + x_3 + x_2 + x_1)$ |

In Table I the symbol · denotes the bit-wise AND operation and the symbol + denotes the bit-wise OR operation. When k=7 it is known that the largest positive number that can be represented is $2^{k-1}-1=2^6-1$. This means that a positive saturation is required if $x_6=1$. When k=6 it is known that the largest positive number that can be represented is $2^{k-1}-1=2^5-1$. This means that a positive saturation is required if $x_5=1$ or $x_6=1$. When k=5 it is known that the largest positive number that can be represented is $2^{k-1}-1=2^4-1$. This means that a positive saturation is required if $x_4=1$ or $x_5=1$ or $x_6=1$. Similarly, when k=2 it is known that the largest positive number that can be represented is $2^{k-1}-1=2^1-1$. This means that a positive saturation is required if $x_1=1$ or $x_2=1$ or $x_3=1$ or $x_4=1$ or $x_5=1$ or $x_6=1$.

It is possible to combine the expressions in Table I to obtain one equation that is valid for all k. This may be achieved by first defining a quantity, an output length parameter, w, which is a function of the length of the output value, such that:

$$w = 2^{k-1} \quad (3)$$

The parameter w has the following binary representation w=[$w_7\ w_6\ w_5\ w_4\ w_3\ w_2\ w_1\ w_0$]. This binary number has the property that for any k such that 1<k<8, only one of the $w_i$'s can be non-zero. Thus we obtain the following aggregate expression:

enable_positive_saturation=$\overline{x_7} \cdot [x_6 \cdot (w_6+w_5+w_4+w_3+w_2+w_1)$+
$x_5 \cdot (w_5+w_4+w_3+w_2+w_1)$+

$x_4 \cdot (w_4+w_3+w_2+w_1)+x_3 \cdot (w_3+w_2+w_1)+x_2 \cdot (w_2+w_1)+x_1 \cdot w_1]$ (4)

This equation combines the expressions in Table I to create an aggregate logic equation that defines the enable_positive_saturation signal for n=8 and any k such that 1<k<8. Equation (4) shows how the signal depends upon the target saturation width k. When k=7, only $w_6$ will be non-zero. This means that enable_positive_saturation depends only on the $x_6$ bit of the input. When k=6, only $w_5$ will be non-zero and so the signal depends on the bits $x_5$ and $x_6$ of the input. Similarly when k=2, which is the smallest practical width, only $w_1$ will be non-zero and enable_positive_saturation depends on all of $x_1, x_2, \ldots, x_6$ which means that positive saturation will be enabled when any of these bits is non-zero.

Equation (4) may be generalized to arbitrary n. Equation (5) below, describes the dependence of the enable_positive_saturation signal for general n and k such that 1<k<n.

$$\text{enable\_positive\_saturation} = \overline{x_{n-1}} \cdot \left( \sum_{p=1}^{n-2} \left[ x_p \cdot \sum_{q=1}^{p} w_q \right] \right) \quad (5)$$

Where $x = [x_{n-1} \ x_{n-2} \ x_{n-3} \ldots x_1 \ x_0]$ and $w = 2^{k-1} = [w_{n-1} \ w_{n-2} \ w_{n-3} \ldots w_1 \ w_0]$. Now, considering the case when x is negative. We know that when x is negative the bit $x_7 = 1$. Defining a signal enable_negative_saturation as follows:

$$\text{enable\_negative\_saturation} = \begin{cases} \text{TRUE} & \text{if } x < -2^{k-1} \\ \text{FALSE} & \text{otherwise} \end{cases} \quad (6)$$

This signal may be used to determine when, for some input x and target data width k, the output y is required to saturate to the largest negative value that is allowed by the k bits: $-2^{k-1}$. For each value of k that is in the range $1 < k < n$, it is possible to determine a logical expression using the $x_i$'s that defines the behavior of the enable_negative_saturation (ENS) signal. Table II below shows these logical expressions.

TABLE II

Logic expression for
enable_negative_saturation when n = 8.

| k | enable_negative_saturation |
|---|---|
| 7 | $x_7 \cdot \overline{x_6}$ |
| 6 | $x_7 \cdot (\overline{x_6} + \overline{x_5})$ |
| 5 | $x_7 \cdot (\overline{x_6} + \overline{x_5} + \overline{x_4})$ |
| 4 | $x_7 \cdot (\overline{x_6} + \overline{x_5} + \overline{x_4} + \overline{x_3})$ |
| 3 | $x_7 \cdot (\overline{x_6} + \overline{x_5} + \overline{x_4} + \overline{x_3} + \overline{x_2})$ |
| 2 | $x_7 \cdot (\overline{x_6} + \overline{x_5} + \overline{x_4} + \overline{x_3} + \overline{x_2} + \overline{x_1})$ |

As before, the symbol·denotes the bit-wise AND operation and the symbol+denotes the bit-wise OR operation. When k=7 it is known that the largest negative number that can be represented is $2^{k-1} = -2^6$.

This means that a negative saturation is required if $x_6 = 0$. When k=6 it is known that the largest negative number that can be represented is $-2^{k-1} = -2^5$. This means that a negative saturation is required if $x_5 = 0$ or $x_6 = 0$. When k=5 it is known that the largest negative number that can be represented is $-2^{k-1} = -2^4$. This means that a negative saturation is required if $x_4 = 0$ or $x_5 = 0$ or $x_6 = 0$. Similarly, when k=2 it is known that the largest negative number that can be represented is $-2^{k-1} = -2^1$. This means that a negative saturation is required if $x_1 = 0$ or $x_2 = 0$ or $x_3 = 0$ or $x_4 = 0$ or $x_5 = 0$ or $x_6 = 0$. It is again possible to obtain a combined expression that is the aggregate of the cases shown in Table II. This is shown in equation (7) below.

$$\text{enable\_negative\_saturation} = x_7 \cdot [\overline{x_6} \cdot (w_6 + w_5 + w_4 + w_3 + w_2 + w_1) + \overline{x_5} \cdot (w_5 + w_4 + w_3 + w_2 + w_1) + \overline{x_4} \cdot (w_4 + w_3 + w_2 + w_1) +$$

$$\overline{x_3} \cdot (w_3 + w_2 + w_1) + \overline{x_2} \cdot (w_2 + w_1) + \overline{x_1} \cdot w_1] \quad (7)$$

As before, $w = 2^{k-1}$ depends on the target saturation width k. This equation combines the expressions in Table II to create an aggregate logic equation that defines the enable_negative_saturation signal for n=8 and any k such that $1 < k < 8$. Equation (7) shows how the signal depends upon the target saturation width k. When k=7, only $w_6$ will be non-zero this means that enable_negative_saturation depends only on the $x_6$ bit of the input. When k=6, only $w_5$ will be non-zero and so the signal depends on the bits $x_5$ and $x_6$ of the input. Similarly when k=2, which is the smallest practical width, only $w_1$ will be non-zero and enable_negative_saturation depends on all of $x_1, x_2, \ldots, x_6$—which means that negative saturation will be enable when any of these bits is non zero.

Equation (7) may be generalized to an arbitrary n. Equation (8) below, describes the dependence of the enable_negative_saturation signal for z general n and k such that $1 < k < n$.

$$\text{enable\_negative\_saturation} = x_{n-1} \cdot \left( \sum_{p=1}^{n-2} \left[ \overline{x_p} \cdot \sum_{q=1}^{p} w_q \right] \right) \quad (8)$$

Again, $x = [x_{n-1} \ x_{n-2} \ x_{n-3} \ldots x_1 \ x_0]$ and $w = 2^{k-1} = [w_{n-1} \ w_{n-2} \ w_{n-3} \ldots w_1 \ w_0]$.

Figure 7:
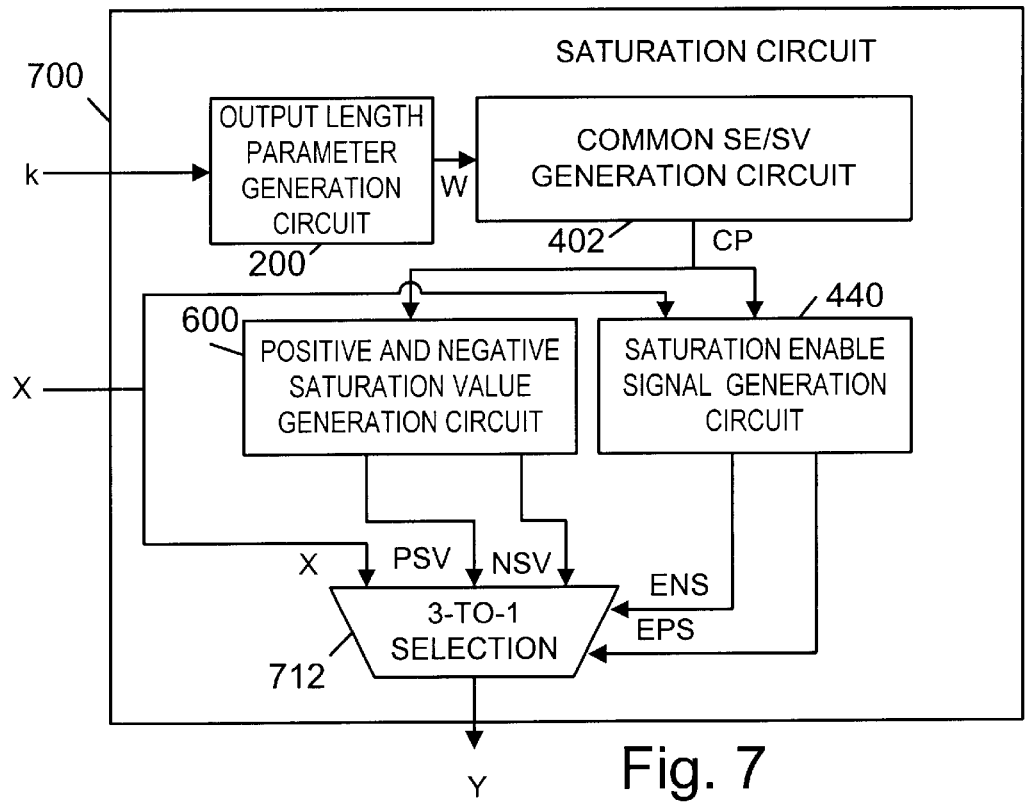
FIGS. 7, 9 and 11 illustrate exemplary saturation value generation circuits implemented in accordance with various embodiments of the present invention.

It is possible to implement equations (3), (5), and (8) using electronic circuitry which may be combined with additional control circuitry to implement a complete saturation value generation circuit such as the circuit 700 illustrated in FIG. 7.

Figure 2:
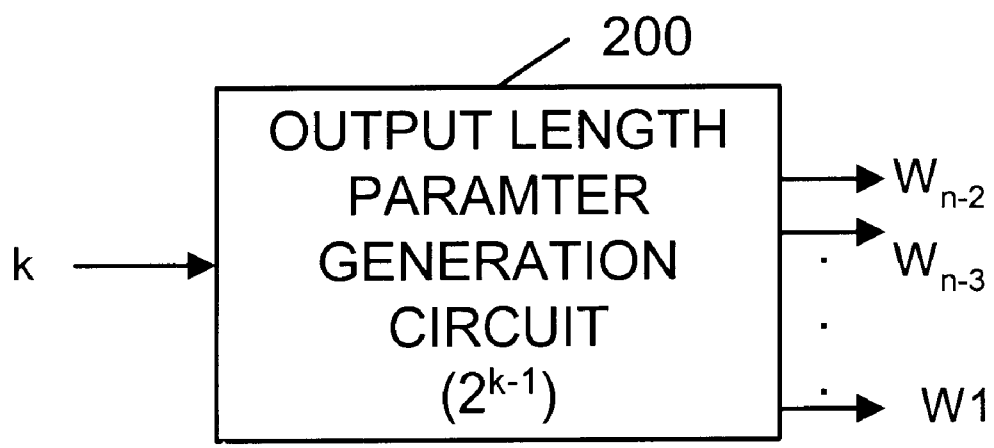
FIG. 2 illustrates a circuit for generating an output length parameter, W, as a function of the number of k bits to be used in representing an output value.

FIG. 2 illustrates a circuit 200 for generating the output length parameter W, in response to the saturation width k, in accordance with equation (3). The circuit 200 performs the operation ($2^{k-1}$) to generate the output length parameter W, which comprises bits $[W_{n-1}, W_{n-2}, \ldots, W_0]$. Since the $W_0$ and $W_{n-2}$ bits are not used in equations (5) and (8) these bits need not be output from the circuit 200. Accordingly, as illustrated, in the exemplary embodiment, the output length parameter generation circuit 200 outputs bits $[W_{n-2}, \ldots, W_1]$, e.g., over a plurality of parallel output lines. As discussed above, only one of the bits of the value w will be asserted at any given time.

Figure 3:
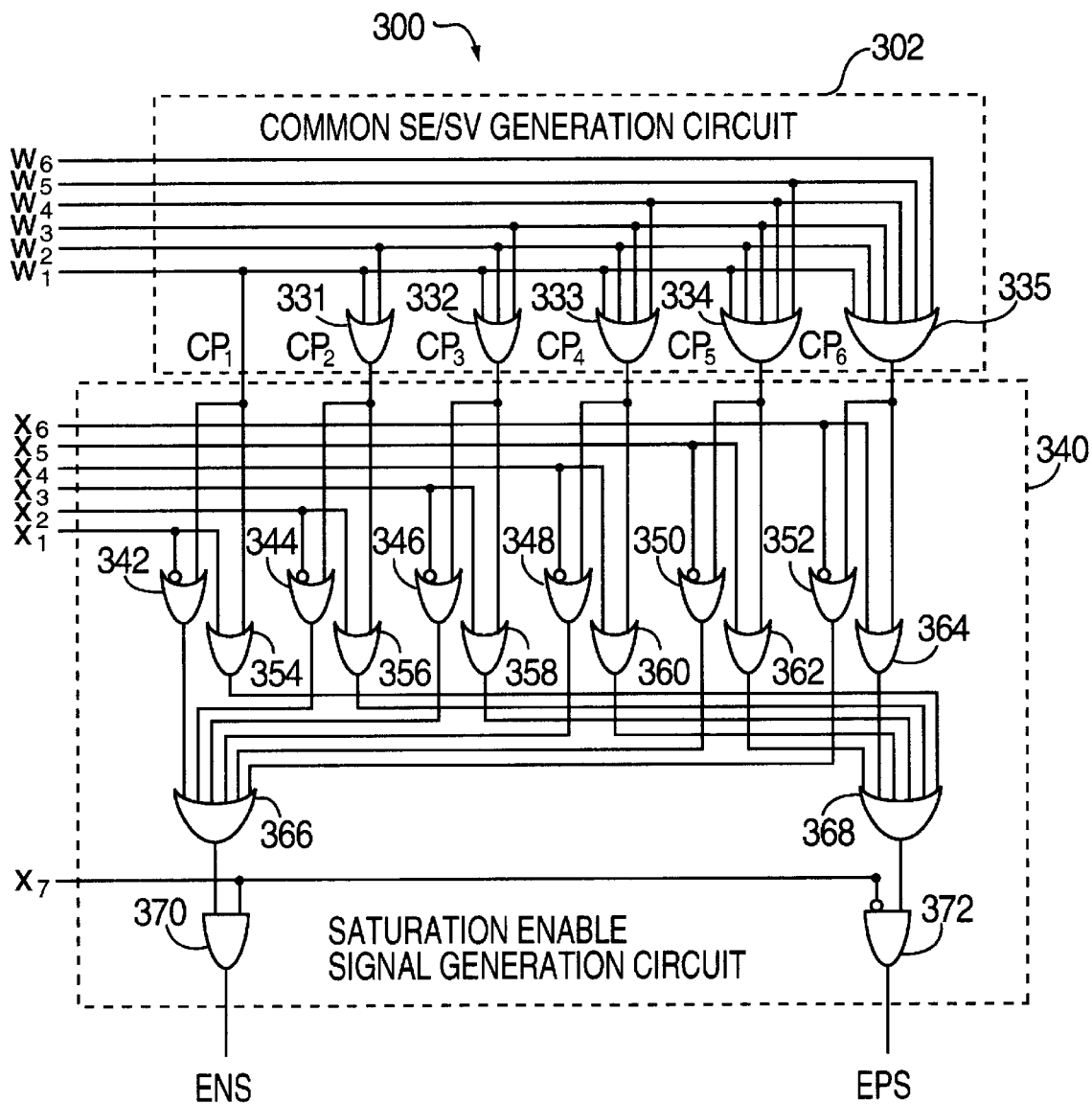
FIG. 3 illustrates circuitry used for generating negative and positive saturation enable signals (ENS and EPS) in the case of an 8 bit output value.

FIG. 3 illustrates circuitry 300 used for generating an enable_negative_saturation (ENS) and enable_positive_saturation (EPS) signals in the case of a saturation width of k where $1 < k < n$, and n=8. The circuitry 300 shown FIG. 3 is a network of interconnected logic gates that implements both equations (5) and (8) for the case n=8.

The circuitry 300 includes a common saturation enable/saturation value (SE/SV) circuit 302 and a saturation enable signal generation circuit 340.

One of the noteworthy features of the FIG. 3 circuitry is that the common SE/SV generation circuit 302 is also used in generating saturation values as will be discussed below. This common use of circuitry, in accordance with the present invention, for the generation of the saturation enable and saturation value signals helps keep the cost of a complete signed saturation circuit low.

The common SE/SV generation circuit 302, comprises first through fifth OR gates, 331, 332, 333, and 335. The circuit 302 receives as its input (n−2) output length parameter bits, i.e., bits $W_1$ through $W_6$ as illustrated in FIG. 3. In response to the (n−2)=6 input bits, W1 through W6, the circuit 302 generates a corresponding set of (n−2) control parameter output bits, $CP_1$ through $CP_6$.

As illustrated in FIG. 3, the control parameter $CP_1$ is directly generated from bit $W_1$ by outputting the bit as the value $CP_1$. Values $CP_2$ through $CP_6$ are generated through the use of corresponding OR gates 331 through 335, by ORing bits $W_{m-1}$ through $W_m$ to generate the corresponding output value $CP_m$, where m is a positive integer in the range of $1 < m < n-1$. For example, control parameter CP1 is generated by using OR gate 331 to logically OR values $W_1$ and $W_2$. Similarly, $CP_6$ is generated by using OR gate 335 to logically OR values $W_1$ through $W_6$.

The saturation enable signal generation circuit 340 receives as its input control parameters $CP_1$ through $CP_{n-2}$ ($CP_6$). In addition, it receives bits X1 through $X_{n-1}$ ($X_7$) of the input value X, which comprises bits $X_0$ through $X_7$.

The saturation enable signal generation circuit 340 comprises a first set of n−2 (6) logical OR gates (342, 344, 346, 348 350, 352) having a first negated input and a second non-negated input. It further comprises a second set of n−2 (6) logical OR gates 354, 356, 358, 360, 362, 364), a pair of n−2 input OR gates 366, 368, a two input OR gate 370 and an additional two input OR gate 372 having one negated input and a non-negated input.

The negated and non-negated inputs to the first set of OR gates 342, 344, 346, 348, 350, 352 is as follows:

negated input of $OR(i)=X_i$ non-negated input of $OR(i)=CP_i$;

where i ranges from 1 to n−2.

The first and second input to the second set of OR gates 354, 356, 358, 360, 362, 364 is as follows:

first input of $OR(i)=X_i$ second input of $OR(i)=CP_i$;

where i ranges from 1 to n−2.

The outputs of the first set of OR gates 342, 344, 346, 348, 350, 352 are coupled to the inputs of the first of the n−2 input OR gates 366. The outputs of the second set of OR gates 354, 356, 358, 360, 362, 364 are coupled to the inputs of the second of the n−2 input OR gates 368.

The enable_negative_saturation (ENS) signal, output by circuit 340, is generated by using the two input OR gate 370 to logically OR the output of the first n−2 input OR gate 366 with bit n−1 (7) of the input value (X). The enable_positive_saturation (EPS) signal, output by circuit 340, is generated by using the two input OR gate 372 which has one negated input to logically OR the output of the second n−2 input OR gate 366 with the negated value of bit n−1 (7) of the input value (X).

In the above described manner, the saturation enable signal generation circuit 340 in conjunction with the common SE/SV generation circuitry 302 is used to generate the ENS and EPS signals in the case where input value X has n=8 bits.

Figure 4:
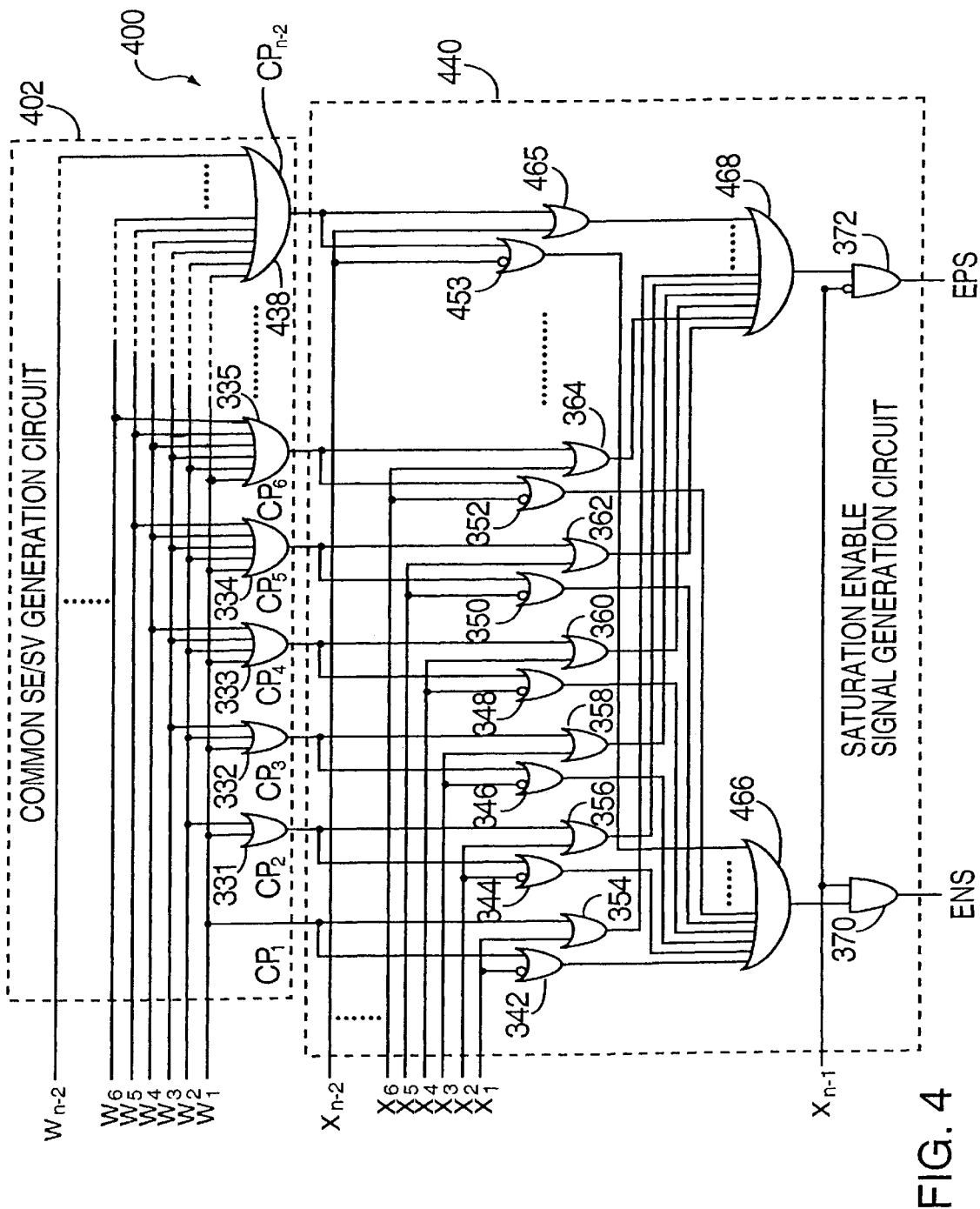
FIG. 4 illustrates circuitry used for generating negative and positive saturation enable signals(ENS and EPS) in the case of an n bit input value width and a k bit output value width, where n and k are positive integers.

The circuitry 400 for generating the ENS and EPS signals for an arbitrary n is shown in FIG. 4. As illustrated, the circuitry 400 comprises a common SE/SV generation circuit 402 and a saturation enable signal generation circuit 440. Both circuits are similar in structure to the structures described above in FIG. 3 for the case where n=8. Accordingly they will not be described in detail. Note however, that the circuit 402 includes additional OR gates, e.g., OR gate 438, and additional data lines to accommodate values of n which exceed 8. Also note that circuit 440 includes additional OR gates 453 and 465 in the first and second sets of two input OR gates and that n−1 input OR gates 466, 468 having additional inputs to accommodate the larger (n−1) number of inputs that are used in place of the seven input OR gates 366, 368.

To implement a complete saturation circuit two saturation values are required, a positive_saturation_value and a negative_saturation_value. For purposes of explanation let us define positive_saturation_value to be the output value of a saturation circuit when enable_positive_saturation is TRUE and negative_saturation_value to be the output value of the saturation circuit when enable_negative_saturation is TRUE. These output values, positive_saturation_value and negative_saturation_value, are both n-bit quantities and their respective values are defined as follows.

$$\text{negative\_saturation\_value} = -2^{k-1} \quad \text{positive\_saturation\_value} = 2^{k-1} - 1 \quad (9)$$

In the twos complement number representation, with the quantities defined as in equation (9), the binary representation of positive_saturation_value is exactly the bit-wise inverse of negative_saturation_value. This means that given a circuit to generate one of the values for arbitrary k it is possible to obtain the other value by performing the bit-wise inverse of the output of the circuit.

Figure 6:
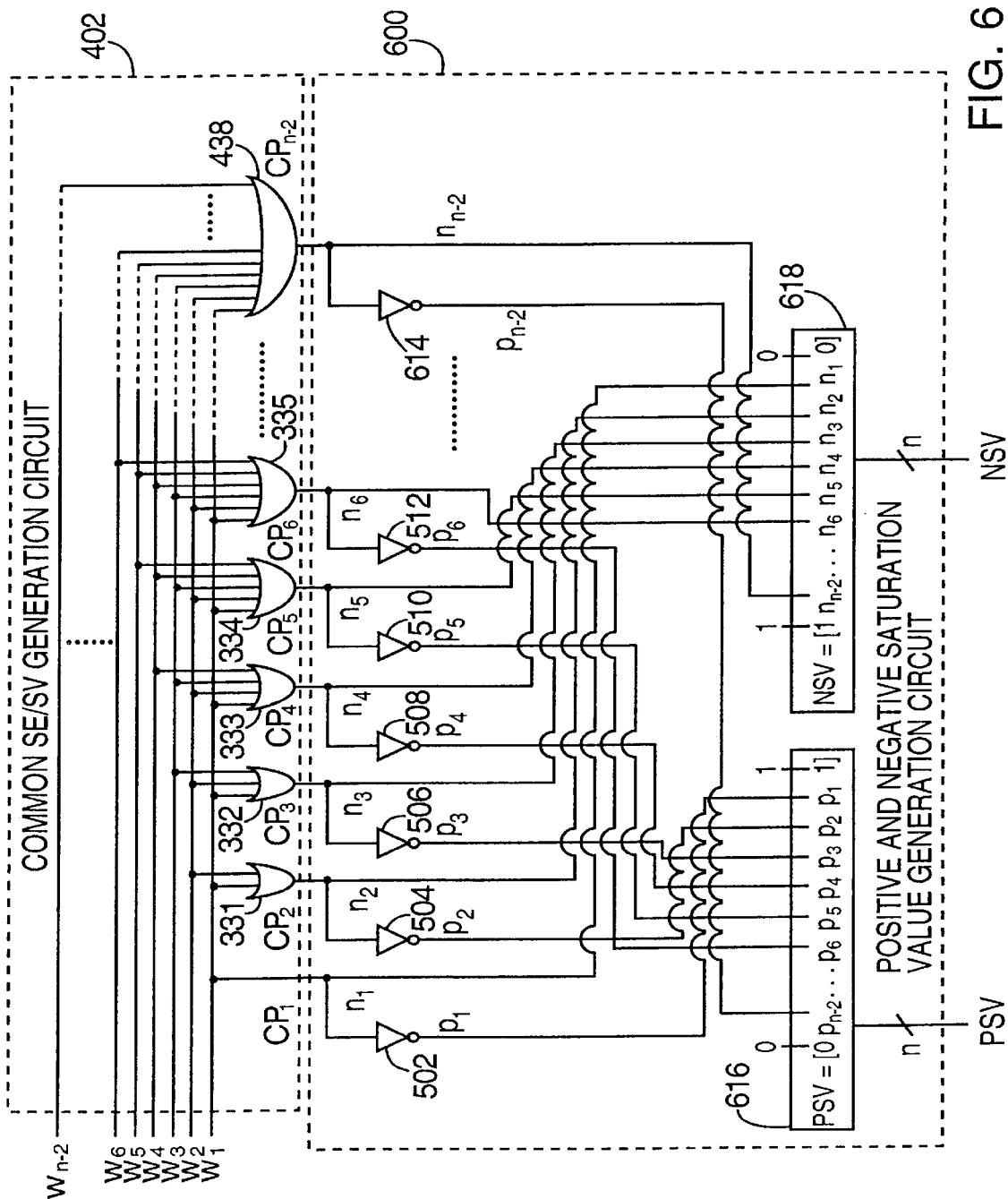
FIG. 6 illustrates circuitry used for generating positive and negative saturation values (PSV, NSV) in the case of an n bit input value and a k bit output value, where n and k are positive integers.

A circuit 600 for computing the saturation values for n=8 can be seen in FIG. 6. A noteworthy feature of the circuit 600 is that it uses the same network of OR gates, i.e., the common SE/SV generation circuit 302 used in generating the ENS and EPS signals. This may be explained by noting that it is possible to write the dependence of negative_saturation_value and w as follows:

$$\text{negative\_saturation\_value} = \left[1, \sum_{q=1}^{n-2} w_q, \sum_{q=1}^{n-3} w_q, \Lambda, \sum_{q=1}^{2} w_q, w_1, 0\right] \quad (10)$$

Each of the bit-wise ORs that are represented by the summation operator that can be seen in equation (10) are already available via equations (5) and (8). This results in an opportunity to reuse circuitry allowing for use of the common SE/SV generation circuit 302.

Figure 5:
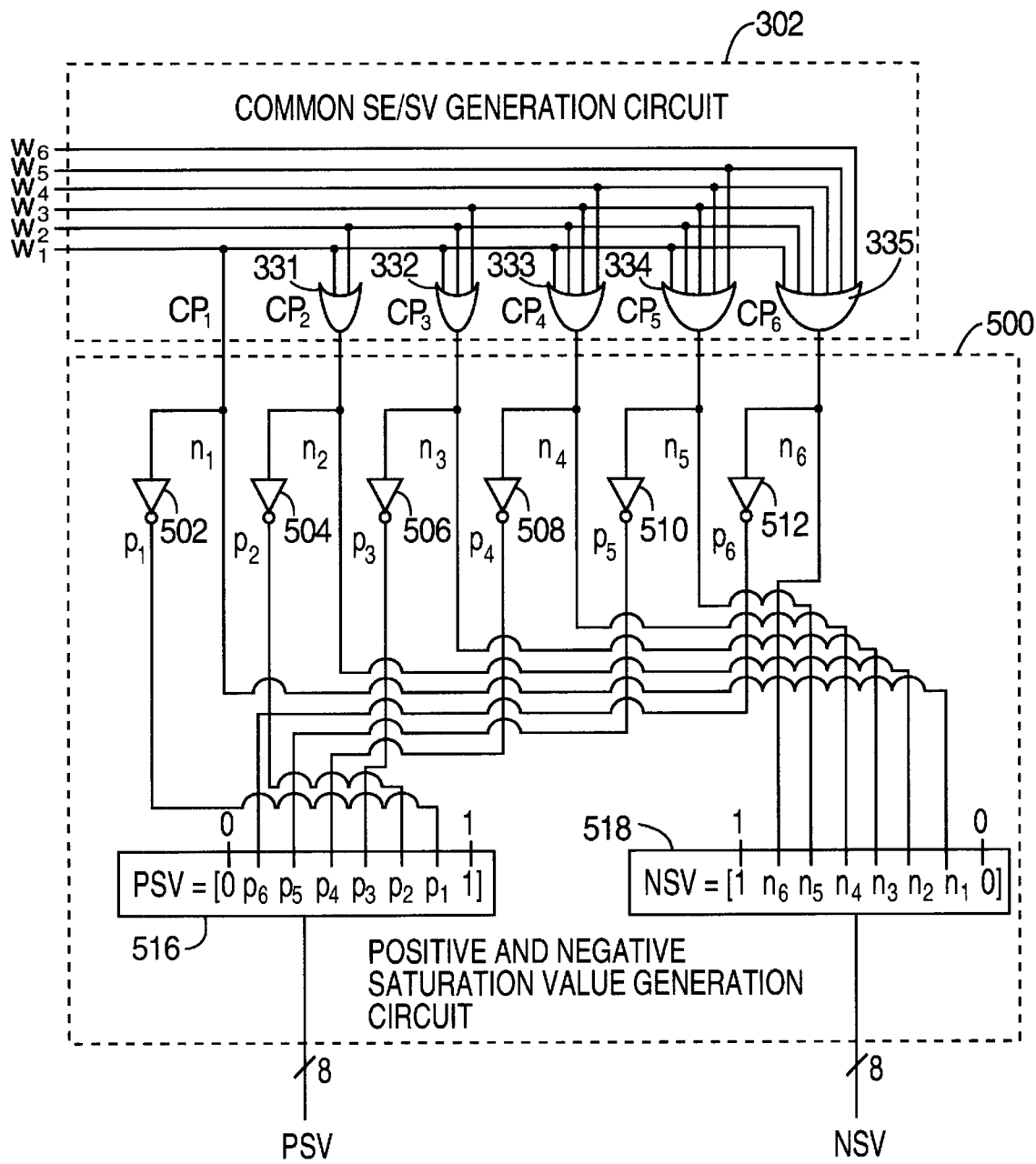
FIG. 5 illustrates circuitry used for generating positive and negative saturation values (PSV, NSV) in the case of an 8 bit output value.

As illustrated in FIG. 5, the positive and negative saturation value generation circuit 500 for the case of n=8 receives as its input control parameter values $CP_1$ through $CP_{n-2}$ ($CP_6$).

The circuit 500 includes a plurality of n−2 (6) inverter circuits $I_1$ through $I_6$ 502, 504, 506, 508, 510, 510 and n line PSV and NSV output connectors 516, 518. The inverter circuits receive as their input the like numbered control parameter (CP) value. For example, inverter $I_1$, receives the control parameter value $CP_1$ as its input. Inverter $I_2$, receives the control parameter value $CP_2$ as its input and so on until inverter $I_{(n-2)}$ receives the value $CP_{(n-2)}$ as its input.

PSV bits 1 through n−2 are generated by the output of the correspondingly numbered inverter circuit. Thus, PSV bit 1, corresponds to the output of inverter $I_1$, 502, while PSV bit n−2 (6), corresponds to the output of the inverter $I_6$ 512.

NSV bits 1 through n−2 correspond directly to the like numbered control parameter value. Thus, NSV bit 1, corresponds to $CP_1$, and so on with NSV bit n−2 corresponding to $CPn_{-2}$ ($CP_6$).

The lower most bit, bit 0, of the PSV is set to 1 while the highest bit, bit 7, is set to 0. In the case of the NSV, the lower most bit is set to 0 and the highest bit set to 1. This is done by tying the lower and higher most output lines of the connectors 516, 518 to a fixed signal source having the appropriate value of 0 or 1.

FIG. 6 shows a circuit 600 for generating the positive and negative saturation values, PSV and NSV, given an arbitrary value of n and k. For a given implementation, n will normally be fixed and k allowed to vary. The structure of this circuit is generally the same as that shown in FIG. 5 however it is extended to accommodate larger data sizes through the addition of more inverters, e.g., inverter 614 and additional lines on the PSV and NSV output connectors 616, 618. Accordingly, in view of the previous discussion of the FIG. 5 circuit 500, the circuit 600 will not be addressed in any further detail.

FIG. 7 illustrates a complete signed saturation circuit 700 that is implemented by combining the output length parameter generation circuit 200, common SE/SV generation circuit 402, positive and negative saturation value generation circuit 600 and saturation enable signal generation circuit 440 with additional control logic in the form of a MUX 712. The various circuits 200, 402, 600 and 440 operate as discussed above.

In addition to being supplied to the saturation enable signal generation circuit 440, the input value X is supplied to the first data input of MUX 712. The PSV and NSV generated by the positive and negative saturation value generation circuit 600, are supplied to second and third data inputs of the MUX 712, respectively.

The MUX 712 outputs a single one of the signals supplied to its three data inputs at any given time. The output of MUX 712 serves as the output of the signed saturation circuit 700. The particular one of the input signals which is output is determined by the state of the negative and positive saturation enable signals ENS and EPS. When the ENS signal is asserted, e.g., set to 1, the MUX 712 outputs the negative saturation value NSV. When the EPS signal is asserted, e.g., set to 1, the MUX 712 outputs the negative saturation value NSV. When neither the ENS nor the EPS signals are asserted, the MUX 712 outputs the input value X. Notably, the logic used to generate the ENS and EPS signals insures that both these signals will not be asserted at the same time.

The behavior of the output of the multiplexer 712 is described by equation (11) below.

$$y = \begin{cases} \text{positive\_saturation\_value} & \text{if enable\_positive\_saturation} = \text{TRUE} \\ \text{negative\_saturation\_value} & \text{if enable\_negative\_saturation} = \text{TRUE} \\ x & \text{otherwise} \end{cases} \quad (11)$$

The circuit 700 may be implemented in hardware and incorporated into one or more electronic devices to facilitate the implementation of signed saturation operations in accordance with the present invention. For example, the circuit 700 may be incorporated into a general purpose processor and used to support a signed saturation operation via hardware. In such an embodiment, a processor instruction which accepts the input parameter X and k as operands may be invoked to perform a signed saturation operation on the value X where the desired saturation width is k bits.

In order to facilitate image processing and other data intensive operations it is often desirable to perform multiple operations in parallel. The basic saturation circuit 700 of the present invention can be extended to operate simultaneously on multiple data items. This allows a so called Single Instruction Multiple Data (SIMD) operation where the same processing operation is applied to several data items.

Figure 8:
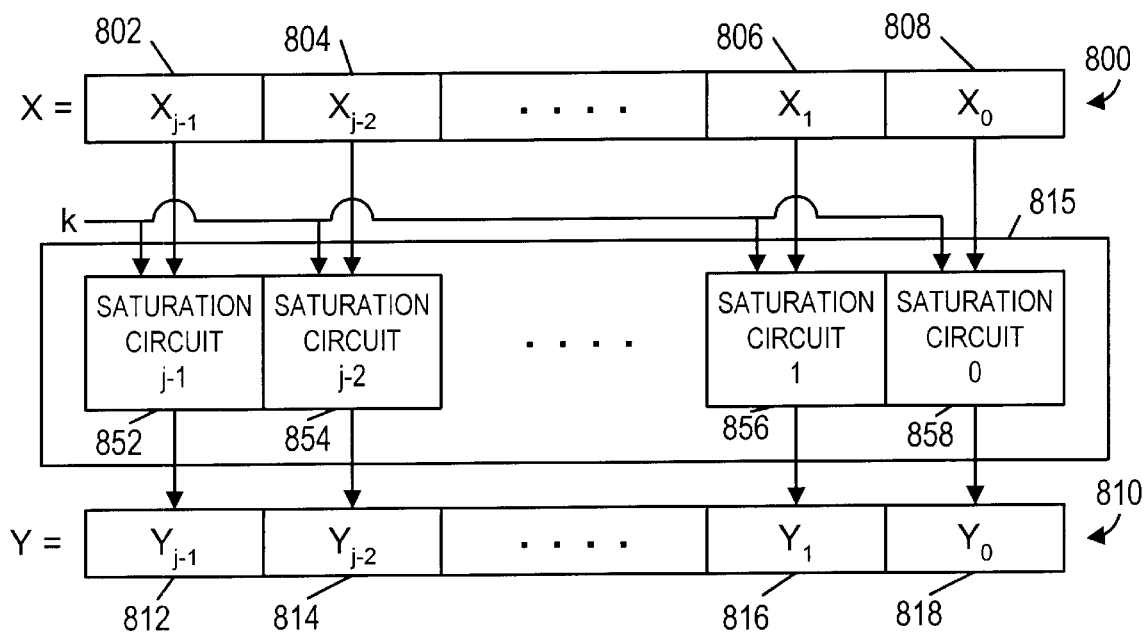
FIGS. 8, 10 and 12 illustrate circuitry for performing a single instruction multiple data signed saturation operation in accordance with various exemplary embodiments of the present invention.

The present invention contemplates the use of SIMD signed saturation operations through the use of multiple saturation circuits implemented, e.g., on a single processor chip, e.g., the processor 815 illustrated in FIG. 8.

FIG. 8 shows how the basic saturation circuit 700 may be extended to support SIMD processing. Here, the input $X=[x_{j-1}\ x_{j-2}\ \ldots\ x_0]$ 800 is an aggregate of j individual n-bit binary quantities 802, 804, 806, 808.

In the FIG. 8 embodiment, j saturation circuits 700 are combined on a single processor 815 in a manner that permits them to operate in parallel. Accordingly, the processor 815 includes j saturation circuits 852, 854, 856, 858 which are capable of processing the n-bit binary quantities which form the input X, in parallel. Thus, the saturation circuits 852, 854, 856, 858 operate on each of the input $x_k$'s (802, 804, 806, 808) separately and produce j outputs, $y_k$, 812, 814, 816, 818, which are used to form an output $Y=[y_{j-1}\ y_{j-2}\ \ldots\ y_0]$. This SIMD processor 815 allows the simultaneous saturation of multiple data items. The combination of circuits 852, 854, 856, 858 provide hardware support for a SIMD saturation instruction in the processor 815.

An exemplary SIMD signed saturation instruction in the processor 815 is:

SAT (X, k)

where X represents the input data set 800, and k represents an optional saturation width parameter. If k is omitted, a default or fixed saturation width is used. In such a case a SIMD saturation instruction might be expressed simply as:

SAT (X)

where X represents the input data set 800.

In response to a SIMD saturation instruction, a signed saturation operation is performed on data X using multiple saturation circuits operating in parallel.

In a SIMD embodiment, n and k are the same for each of the plurality of individual saturation circuits 852, 854, 856, 858 used to implement a SIMD instruction. Accordingly, the PSV, NSV and control parameters CP will be the same for each of the saturation circuits. In order to avoid redundant circuitry, the values PSV, NSV and control parameters CP may be calculated by a single set of circuitry and then distributed to the individual saturation circuits.

Figure 9:
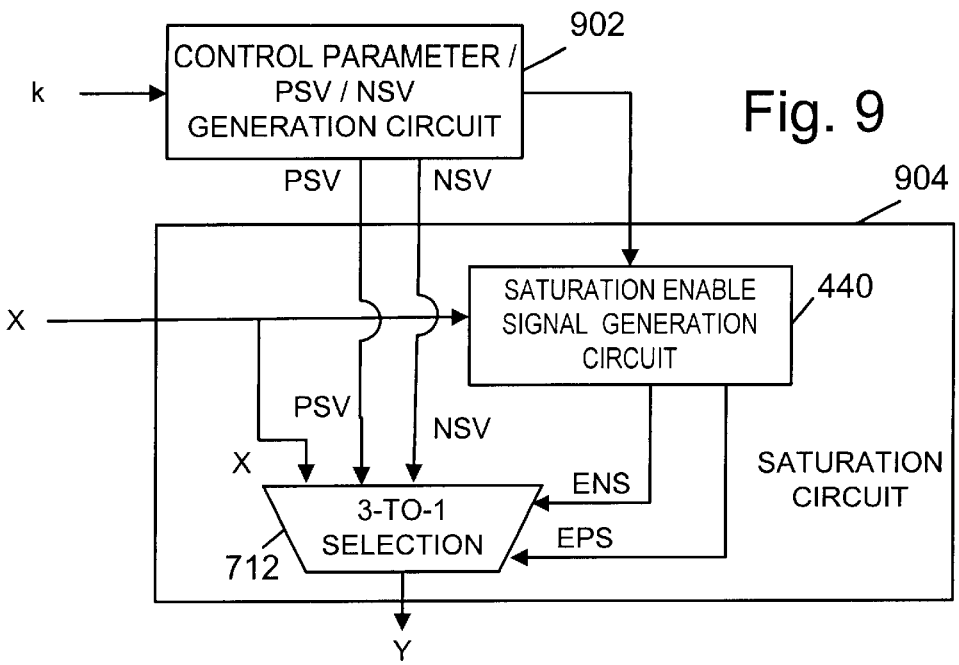

FIG. 9 illustrates an embodiment where the values PSV, NV and CP are generated external to an individual saturation circuit 903 using a control parameter/PSV/NSV generation circuit 902. The circuit 902 may be implemented using the output length parameter generation circuit 200, common SE/SV generation circuit 402 and positive and negative saturation value generation circuit 600 illustrated in FIG. 7. Note that in the FIG. 9 embodiment, as a result of placing the circuit 902 external to the saturation circuit 903, the saturation circuit 903 has been simplified compared to the FIG. 7 embodiment and comprises the saturation enable signal generation circuit 440 and output MUX 712.

Figure 10:
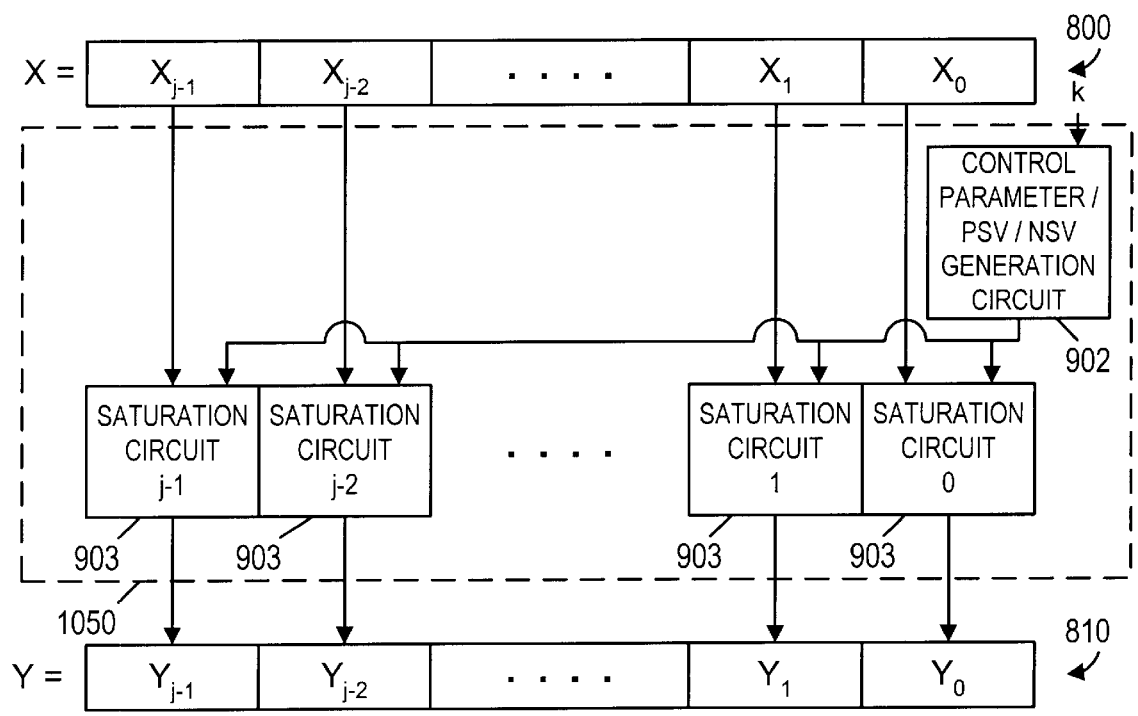

FIG. 10 illustrates how a single control parameter/PSV/NSV generation circuit 902 can be combined with multiple saturation circuits 903 to support a SIMD signed saturation operation in a processor or video decoder circuit 1050. Note that the control parameter/PSV/NSV generation circuit 902 is coupled in the FIG. 10 embodiment to each of the j saturation circuits 903 thereby providing them with the same PSV, NSV and CP values.

In the case where n and k are fixed, the PSV, NSV and control parameters CP can be pre-computed, e.g., prior to manufacturing of a processor or device incorporating a saturation circuit, and stored within a saturation circuit thereby eliminating the need for the control parameters/PSV/NSV generation circuit 902.

Figure 11:
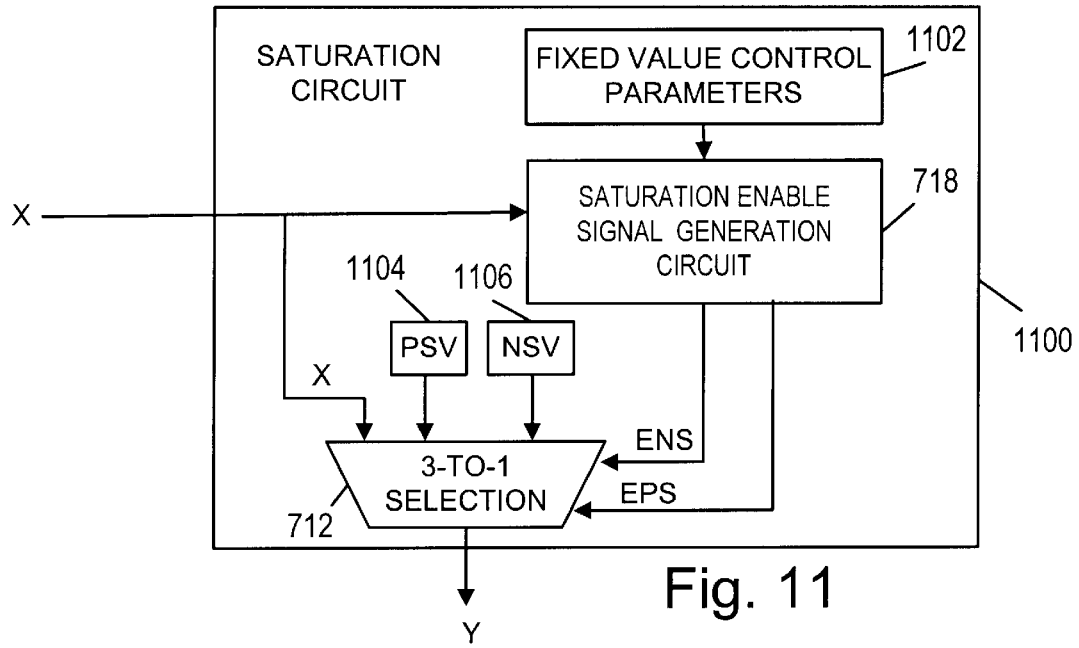

FIG. 11 illustrates a saturation circuit 1100 designed to perform a signed saturation operation in the case of an output y having a fixed number of k bits. In the FIG. 11 embodiment PSV and NSV values 1104, 1106 and fixed control value control parameters (CP) 1104, 1106, 1102 are stored in non-volatile memory included in the saturation circuit 1100 and then supplied as needed to the saturation enable signal generation circuit 718 and MUX 712. In this manner, the need for the control parameter/PSV/NSV generation circuit 902 of the FIGS. 9 and 10 embodiments is avoided.

Figure 12:
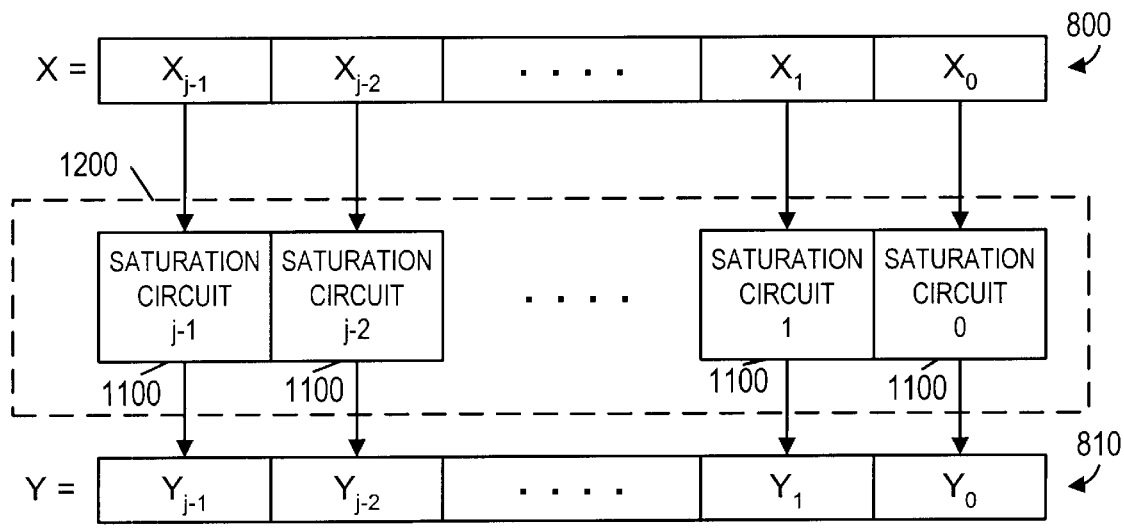

FIG. 12 illustrates how multiple saturation circuits 1102 can be combined to support a SIMD signed saturation operation in a processor or video decoder circuit 1200. Note that each saturation circuit 1102 receives and process a different one of the n-bit inputs of the multi-unit input value X to create the output value Y which includes multiple k output data units, one corresponding to each one of the multiple saturation circuits 1102.

The various saturation circuits of the present invention discussed above can be used as hardware support for an instruction in a programmable microprocessor core, e.g., either a single instruction single data operation or a SIMD operation. The signed saturation methods and apparatus of the present invention are particularly useful in a SIMD architecture system where multiple data items are simultaneously processed. The methods and apparatus of the present invention are also well suited in application specific hardware, e.g., MPEG-2 video decoders. Such an embodiment can be used to facilitate the saturation operation that is the final step in the MPEG-2 inverse quantization process.

What is claimed:

1. A device for performing at least one saturation operation, the device comprising:
   a saturation control signal generation circuit for generating first and second saturation control signals as a function of a data value input to said control signal generation circuit, the saturation control signals being of a first or second state, said saturation control signal generation circuit including means for logically ANDing a highest order bit included in said data value with an additional value generated from at least one other bit included in said data value to generate one of said first and second saturation control signals; and
   a controllable switching device including a data value input for receiving a data value, a first saturation threshold input for receiving a first saturation threshold value and a second saturation threshold input for receiving a second saturation threshold value, the switching device being responsive to the state of the first and second saturation control signals to output a selected one of the data value, first saturation threshold value, and second saturation threshold.

2. The saturation device of claim 1,
   wherein the first saturation threshold value is a positive saturation threshold value, the second saturation threshold value is a negative saturation threshold value;
   wherein said saturation control signal generation circuit includes means for negating the value of said highest order bit and for logically ANDing said negated highest order bit with a one bit control value generated from a plurality of bits from said data value and a width indicator value; and
   wherein the controllable switching device outputs the positive saturation threshold value when the first saturation control signal is in the first state and outputs the negative saturation threshold value when the second control signal is in the first state.

3. The saturation device of claim 1, further comprising:
   a saturation value generation circuit coupled the first and second saturation threshold value inputs of the controllable switching device.

4. The saturation device of claim 3, wherein the saturation value generation circuit further comprises:
   a saturation width input for receiving a value k indicating the number of bits to be used to represent a controllable switching device output value.

5. The saturation device of claim 3, wherein the saturation value generation circuit further comprises:
   means for receiving a saturation width parameter k, where k is a positive integer, and
   means for generating said positive and negative saturation threshold values from said saturation width parameter.

6. The saturation device of claim 1, further comprising:
   an additional saturation control signal generation circuit for generating third and fourth saturation control signals, the saturation control signals being of the first or second state; and
   an additional controllable switching device including an additional data value input for receiving an additional data value, a third saturation threshold input for receiving the first saturation threshold value and a fourth saturation threshold input for receiving the second saturation threshold value, the switching device being responsive to the state of the third and fourth saturation control signals to output a selected one of the additional data value, first saturation threshold value, and second saturation threshold value.

7. The saturation device of claim 6, wherein the controllable switching device and the additional controllable switching device are arranged in parallel permitting the simultaneous processing of said data value and said additional data value.

8. A device for processing data, comprising:
   a plurality of saturation circuits arranged in parallel, each saturation circuit having an input for receiving an n-bit data unit including a highest order bit, where n is a positive integer and including a saturation control signal generation circuit, the saturation control signal generation circuit including an AND circuit for logically ANDing a highest order bit included in said n-bit data unit with an additional value generated from at least one other bit included in said n-bit data unit to thereby generate a saturation control signal;
   means for supplying a plurality of n-bit data units in parallel to the inputs of said plurality of saturation circuits, one n-bit data unit being supplied to each of the plurality of saturation circuits; and
   means for outputting, in parallel, a plurality of values generated by said saturation circuits, each saturation circuit generating one output value.

9. The device of claim 8, further comprising:
   a positive and negative saturation threshold value generation circuit coupled to each one of the plurality of saturation circuits for generating positive and negative saturation values in response to an input indicating a saturation width k where k, is a positive integer and where 1<k<n.

10. The device of claim 8, wherein each one of the plurality of saturation circuits includes a stored positive saturation threshold value.

11. The device of claim 10,
    wherein each one of the plurality of saturation circuits further includes:
    a stored negative saturation threshold value;
    and means for selectively outputting one of a value represented by the n-bit input data unit, the positive saturation threshold value, or the negative saturation threshold value.

12. The device of claim 8, wherein the device is part of a single instruction multiple data processor.

13. The device of claim 8, wherein the device is part of a video decoder circuit.

14. A processing circuit, comprising:
    first through $j^{th}$ signed saturation circuits arranged in parallel, each signed saturation circuit including an n-bit input and a corresponding output for outputting a value generated by performing a signed saturation operation on the n-bit input value, where j is a positive integer and including a saturation control signal generation circuit, the saturation control signal generation circuit including means for logically ANDing a highest order bit included in each data value received by said n-bit input with an additional value generated from at least one other bit included in the same received data value to thereby generate a saturation control signal.

15. The processing circuit of claim 14, further comprising:

means for generating a positive and a negative saturation value threshold, said means for generating being coupled to each one of said first through $j^{th}$ signed saturation circuits.

16. The processing circuit of claim 14, wherein the saturation control signal generation circuit included in each one of said first through $j^{th}$ generates first and second saturation enable control signals, the saturation enable control signals being of a first or second state, one of said first and said saturation enable control signals being said saturation enable control signal generated by said means for logically ANDing;

each one of said first through jth signed saturation circuits further including:
a controllable switching device including a data value input for receiving the data value represented by the n-bit input value to the signed saturation circuit, a first saturation threshold input for receiving a first saturation threshold value and a second saturation threshold input for receiving a second saturation threshold value, the switching device being responsive to the state of the first and second saturation control signals to output a selected one of the data value, first saturation threshold value, and second saturation threshold.

17. A method of controlling a processing device including a hardware circuit for performing a signed saturation operation, the method including the steps of:

receiving a signed saturation operation instruction with an operand; and using said signed saturation circuit to implement a signed saturation operation on said operand, said step of using said signed saturation circuit to implement a signed saturation operation including generating at least one saturation control signal by logically ANDing a highest order bit included in a data value included in said operand with an additional value generated from at least one other bit included in said data value.

18. The method of claim 17, wherein an output saturation width parameter, k, is received with the signed saturation operation instruction, where k is a positive integer; and wherein the method further includes the step of:
operating the signed saturation circuit to determine positive and negative saturation threshold values as a function of the received saturation width parameter, k.

19. The method of claim 17, wherein the processing device includes a total of at least j hardware circuits for performing a signed saturation operation; and wherein the operand received with the signed saturation operation instruction includes j n-bit data units, the method comprising the step of:

operating the at least j hardware circuits for performing a signed saturation operation to process, in parallel, the j n-bit data units included in the received operand.

20. A method of performing a saturation operation, comprising the steps of:

receiving a value;

generating a negative saturation control signal and a positive saturation control signal from said received value, said step of generating a negative saturation control signal including logically ANDing a highest order bit included in the received value with an additional value generated from at least one other bit included in said received value; and operating a switching circuit to output one of a positive saturation threshold value, a negative saturation threshold value and a third value in response to the generated negative and positive saturation control signals.

21. The method of claim 20, wherein said step of generating the negative and positive saturation threshold values is performed as a function of an input parameter indicating a saturation width.

22. The method of claim 20, wherein said third value is the input value and wherein said switching circuit is a MUX having three data inputs and one output.

23. The method of claim 20, further comprising the steps of: storing the positive and negative saturation threshold values in non-volatile memory.

24. A method of performing a saturation operation on multiple data elements, comprising the steps of:

receiving a set of j data elements, where j is a positive integer; and processing, in parallel, each of the j data elements using a different signed saturation circuit, to produce a set of j output values, each one of the j output values being produced by a different signed saturation circuit, each used signed saturation circuit generating a saturation control signal by logically ANDing a highest order bit included in one of the j data elements with an additional value generated from at least one other bit included in said one of the j data elements.

25. The method of claim 24, wherein the step of processing each of the j data elements using a different signed saturation circuit includes the step of operating each used signed saturation circuit to:
operate a switching circuit included in the signed saturation circuit to output one of a positive saturation threshold value, a negative saturation threshold value and a third value in response to the saturation control signal generated by said used signed saturation circuit and a positive saturation control signal also generated by said used signed saturation circuit.

26. The method of claim 25, wherein the third value is the value of the one of the j data elements being processed by the signed saturation circuit.

* * * * *